(12) United States Patent
Kao

(10) Patent No.: US 8,054,378 B2
(45) Date of Patent: Nov. 8, 2011

(54) WEBCAM MODULE HAVING A CLAMPING DEVICE

(75) Inventor: Kuo-Hua Kao, Sinjhuang (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 384 days.

(21) Appl. No.: 12/453,704

(22) Filed: May 20, 2009

(65) Prior Publication Data
US 2010/0039552 A1   Feb. 18, 2010

(30) Foreign Application Priority Data

Aug. 12, 2008   (CN) .................. 2008 2 0132733 U

(51) Int. Cl.
*H04N 5/225* (2006.01)
*G03B 17/00* (2006.01)
(52) U.S. Cl. ........................................ 348/373; 396/419
(58) Field of Classification Search .......... 348/373–376; 396/419, 428
See application file for complete search history.

(56) References Cited

U.S. PATENT DOCUMENTS

| | | | | |
|---|---|---|---|---|
| D394,669 S | * | 5/1998 | Becker et al. ................ | D16/242 |
| 5,855,343 A | * | 1/1999 | Krekelberg .................... | 248/121 |
| D411,220 S | * | 6/1999 | Surabian ....................... | D16/242 |
| 6,239,841 B1 | * | 5/2001 | Verstockt et al. ............. | 348/373 |
| D451,939 S | * | 12/2001 | Roh ............................. | D16/202 |
| 6,663,066 B1 | * | 12/2003 | Hong ........................ | 248/231.41 |
| 6,679,463 B1 | * | 1/2004 | Chen ............................ | 248/126 |
| 6,731,340 B1 | * | 5/2004 | Lai ............................... | 348/373 |
| 6,738,094 B1 | * | 5/2004 | Minami et al. ................ | 348/373 |
| 6,845,954 B1 | * | 1/2005 | Moayer et al. ............. | 248/187.1 |
| D534,939 S | * | 1/2007 | Sheehan et al. .............. | D16/208 |
| 7,572,073 B2 | * | 8/2009 | Kenoyer et al. .............. | 396/428 |
| 7,703,731 B1 | * | 4/2010 | Kuo ........................ | 248/229.22 |
| 7,854,420 B2 | * | 12/2010 | Depay et al. ................ | 248/316.7 |
| 7,931,243 B2 | * | 4/2011 | Yim et al. ................ | 248/229.13 |
| 2005/0068461 A1 | * | 3/2005 | Lin et al. ...................... | 348/375 |
| 2005/0230583 A1 | * | 10/2005 | Wu .......................... | 248/231.41 |
| 2006/0170817 A1 | * | 8/2006 | Wu ............................... | 348/373 |
| 2007/0012833 A1 | * | 1/2007 | Depay et al. ............. | 248/226.11 |
| 2007/0212057 A1 | * | 9/2007 | Liang .......................... | 396/428 |
| 2008/0022337 A1 | * | 1/2008 | Yang ............................ | 725/105 |
| 2009/0008521 A1 | * | 1/2009 | Lee et al. ................. | 248/226.11 |
| 2009/0103913 A1 | * | 4/2009 | Huang .......................... | 396/428 |
| 2010/0302436 A1 | * | 12/2010 | Gasnier et al. ............... | 348/373 |

FOREIGN PATENT DOCUMENTS

TW        M333589        6/2008

* cited by examiner

*Primary Examiner* — Timothy J Henn
(74) *Attorney, Agent, or Firm* — Li & Cai Intellectual Property (USA) Office

(57) ABSTRACT

A webcam module having a clamping device includes a body portion, a first sliding unit, a second sliding unit, a first torsion element and a second torsion element. The first sliding unit and the second sliding unit are provided on the body portion. The first sliding unit is able to slide by means of the cooperation between the sliding block and the guiding thoughgroove. The torsion elements are used to generate a force for clamping an article. Via the above arrangement, a user can turn a first turning portion of the first sliding unit and a second turning portion of the second sliding unit, thereby opening a first clip and a second clip to a predetermined angle. The torsion elements allow the first clip and the second clip to be clamped at a predetermined position.

18 Claims, 6 Drawing Sheets

WEBCAM MODULE HAVING A CLAMPING DEVICE

BACKGROUND OF THE INVENTION

1. Field of the Invention

The present invention relates to a webcam module having a clamping device, and in particular to a webcam module which has high degree of integration and can be clamped on other devices.

2. Description of Related Art

With the continuous advancement of modern science technology, the speed of transmitting information is more and more amazing. The high speed achieved by a wired or wireless transmission allows people to grasp the messages all over the world very quickly, so that the concept of a global village is generated. With the widening of network bandwidth, word message cannot satisfy the information flow necessary for industries or individuals, so that the transmission of information containing pictures and voices are gradually developed. Therefore, webcams have been widely used in a picture information end of the Internet, whereby, for example, technical meetings held by providers and downstream manufacturers or remote video courses offered by universities and colleges can be achieved.

However, in order to achieve a preferred aspect of a webcam, most manufacturers devote themselves to design an improved base associated with the webcam and a clamping mount for clamping or attaching to other articles, thereby facilitating the video meeting or instantaneous communication by Internet.

However, the conventional webcam cannot form a preferred mechanism with a base or clamping mount. For example, Taiwan Patent No.M333589 discloses a base for a webcam, which can be clamped on a screen or disposed on a table directly for use. However, such a webcam has to be mounted to the base, so that the combined volume of the webcam and the base is too large, which may affect the operation of the user adversely. Furthermore, the assembly of the webcam and the base lacks integration, so that the additional value of the product cannot be raised. In the webcam available in the market, elastic elements provided in the clamping mount may be exposed to the outside. Since the elastic element is used to provide a clamping torsion force, the exposed elastic element may make it in danger of falling off or getting damaged easily by external force. As a result, the above-mentioned webcam will lose its effect of clamping articles, which makes the user feel inconvenience in use.

Consequently, because of the above limitation resulting from the technical design of prior art, the inventor strives via real world experience and academic research to develop the present invention, which can effectively improve the limitations described above.

SUMMARY OF THE INVENTION

The primary object of the present invention is to provide a webcam module having a clamping device. With its compact design, the volume and size of the webcam module can be reduced efficiently, thereby conforming to the requirements for the usage of the webcam module.

Another object of the present invention is to provide a webcam module having a clamping device, in which a torsion spring is disposed in a space within a body portion, thereby avoiding the torsion spring from being hit by external force. In this way, the lifetime and the quality of assembly of the webcam module can be increased.

In order to achieve the above objects, the present invention provides a webcam module having a clamping device, which includes a body portion, a first sliding unit, a second sliding unit, a first torsion element and a second torsion element. The body portion is formed by a first casing and a second casing. The first casing is provided with a first guiding though-groove and a second guiding though-groove. The second casing is provided with a third guiding though-groove and a fourth guiding though-groove. The first sliding unit includes a first sliding piece, a first sliding block and a second sliding block. The first sliding piece is provided outside the first casing. The first sliding block and the second sliding block are provided inside the first casing and correspond to the first guiding though-groove and the second guiding though-groove respectively, thereby connecting to the first sliding piece. The top end and bottom end of the first sliding piece extend to form a first turning portion and a first clip respectively. The second sliding unit includes a second sliding piece, a third sliding block and a fourth sliding block. The second sliding piece is provided outside the second casing. The third sliding block and the fourth sliding block are provided inside the second casing and correspond to the third guiding though-groove and the fourth guiding though-groove respectively, thereby connecting to the second sliding piece. The top end and the bottom end of the second sliding piece extend to form a second turning portion and a second clip respectively. Both ends of the first torsion element are connected to the first sliding block and the third sliding block respectively. Both ends of the second torsion element are connected to the second sliding block and the fourth sliding block respectively. The user turns the first turning portion and the second turning portion, thereby opening the first clip and the second clip to a predetermined angle. By means of the first torsion element and the second torsion element, the first clip and the second clip are clamped at a predetermined position. The actions of the clips and the turning portions can be achieved by means of the cooperation between the guiding though-grooves and the sliding blocks.

The present invention further provides a webcam module having a clamping device, which includes a body portion, a first sliding unit, a second sliding unit, a first torsion element and s second torsion element. The body portion is formed by a first casing and a second casing. The first casing and the second casing are provided with at least one corresponding guiding though-groove respectively. The first sliding unit includes a first sliding piece and at least one sliding block. The first casing is provided between the first sliding piece and the sliding block of first sliding unit. The sliding block of the first sliding unit corresponds to the guiding though-groove of the first casing and is connected to the first sliding piece. The top end and bottom end of the first sliding piece extend to form a first turning portion and a first clip respectively. Similarly, the second sliding unit includes a second sliding piece and at least one sliding block. The second casing is provided between the second sliding piece and the sliding block of the second sliding unit. The sliding block of the second sliding unit corresponds to the guiding though-groove of the second casing and is connected to the second sliding piece. The top end and bottom end of the second sliding piece extend to form a second turning portion and a second clip respectively. Both ends of the at least one torsion element are connected to the sliding block of the first sliding unit and the sliding block of the second sliding unit respectively. The user turns the first turning portion and the second turning portion, thereby opening the first clip and the second clip to a predetermined angle. By means of the torsion element, the first clip and the second clip are clamped at a predetermined position. The actions of the clips and the turning portions can be achieved by means of the cooperation between the guiding though-grooves and the sliding blocks.

Via to the above-mentioned structure, the webcam module having a clamping device can integrate an image module, a torsion element and other members into one body. Therefore, the present invention can reduce the volume of a portable electronic card connector effectively. Furthermore, the present invention utilizes a cover to cooperate with the body portion, so that the above components will not be exposed to the outside, thereby protecting them.

Furthermore, the cooperation between the sliding blocks and the guiding though-grooves allows the clips and the turning portions to be drivingly connected with each other, thereby generating more convenience in use and better additional value of the product of the webcam module.

In order to further understand the characteristics and technical contents of the present invention, a detailed description relating thereto will be made with reference to the accompanying drawings. However, the drawings are illustrative only, but not used to limit the scope of the present invention.

BRIEF DESCRIPTION OF THE DRAWINGS

FIG. 3A is a schematic view showing the torsion action of the webcam module having a clamping device according to the present invention.

DETAILED DESCRIPTION OF THE PREFERRED EMBODIMENTS

Figure 1:
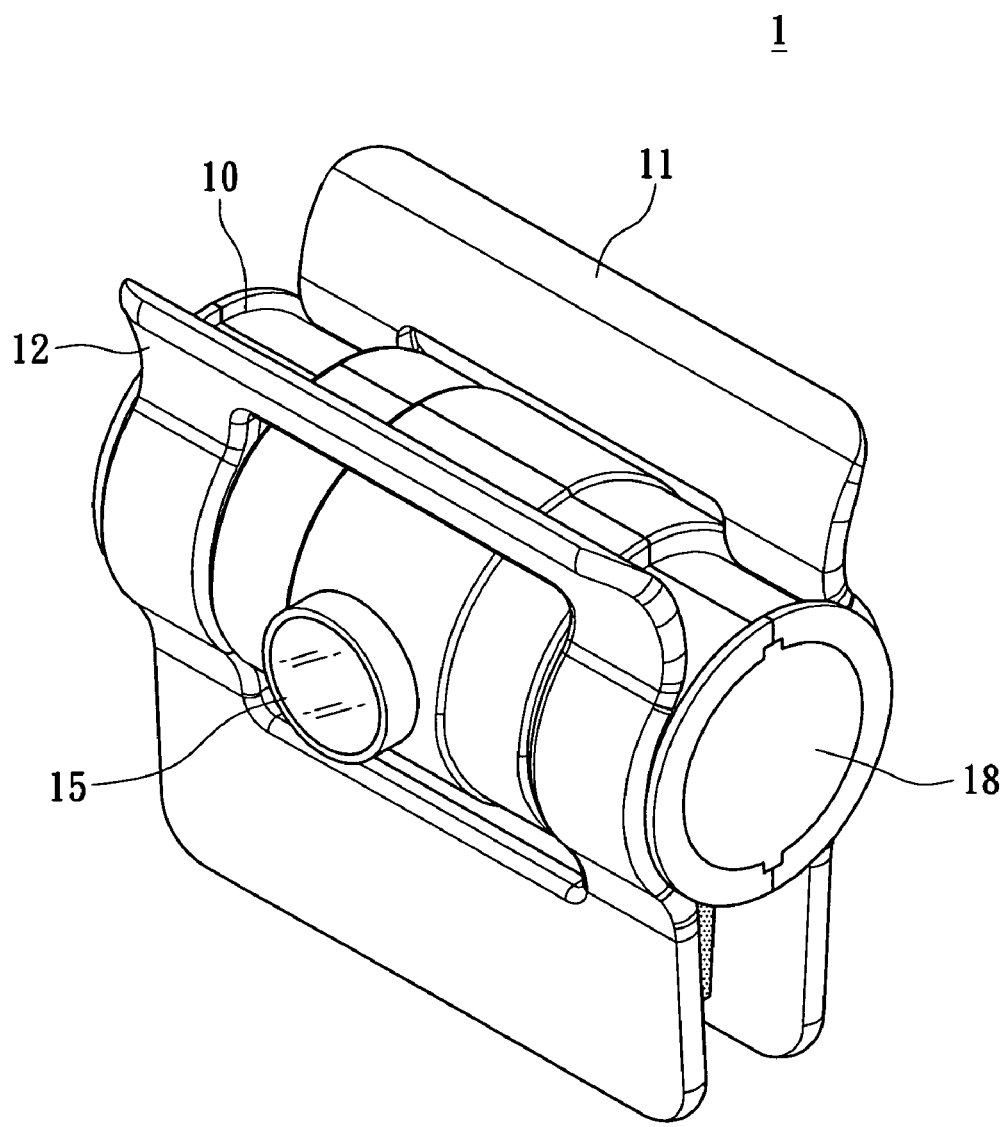
FIG. 1 is a schematic view showing the webcam module having a clamping device according to the present invention.
Figure 1A:
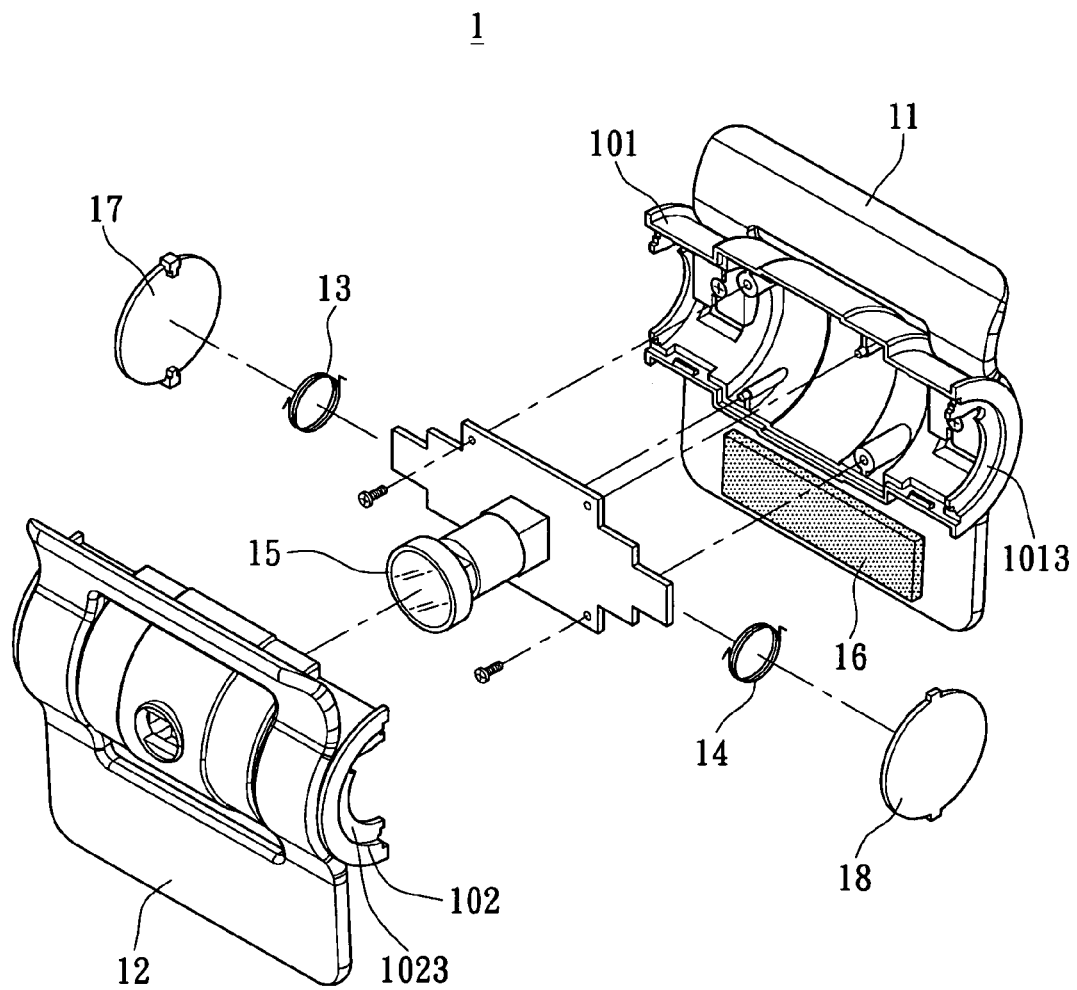
FIG. 1A is a partial exploded assembled view showing the webcam module having a clamping device according to the present invention.

Please refer to FIGS. 1 to 4. The present invention provides a webcam module 1 having a clamping device. The webcam module 1 having a clamping device can be mounted to a predetermined position by means of a torsion force, such as a side frame of a liquid crystal screen 2 or other positions easy to be clamped. FIG. 1 and FIG. 1A are an assembled view and an exploded assembled view showing the webcam module 1 having a clamping device respectively. The webcam module 1 having a clamping device includes a body portion 10, a first sliding unit 11, a second sliding unit 12, a first torsion element 13 and a second torsion element 14. A description relating to the above units is made as follows.

Figure 2:
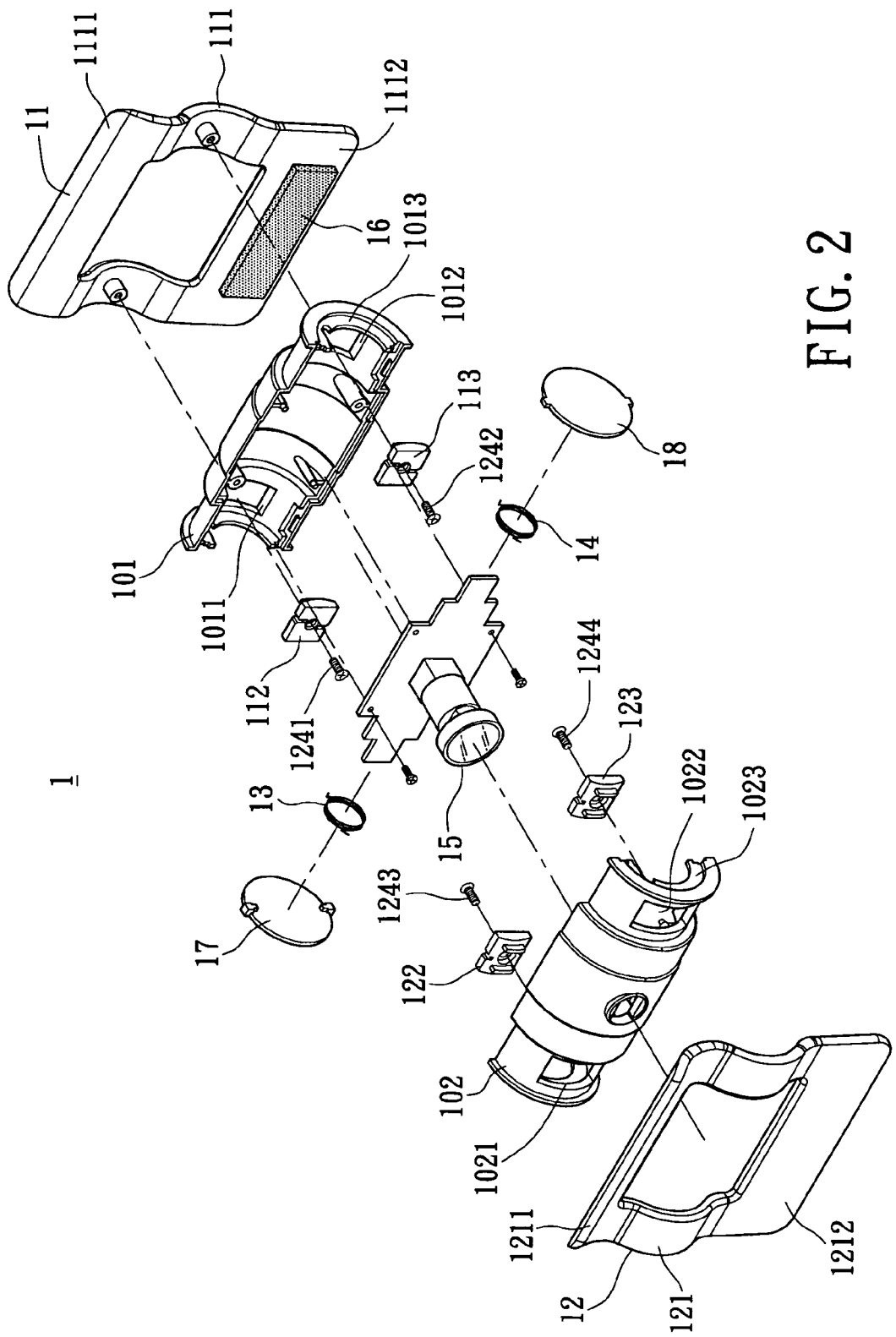
FIG. 2 is an exploded view showing the webcam module having a clamping device according to the present invention.
Figure 3:
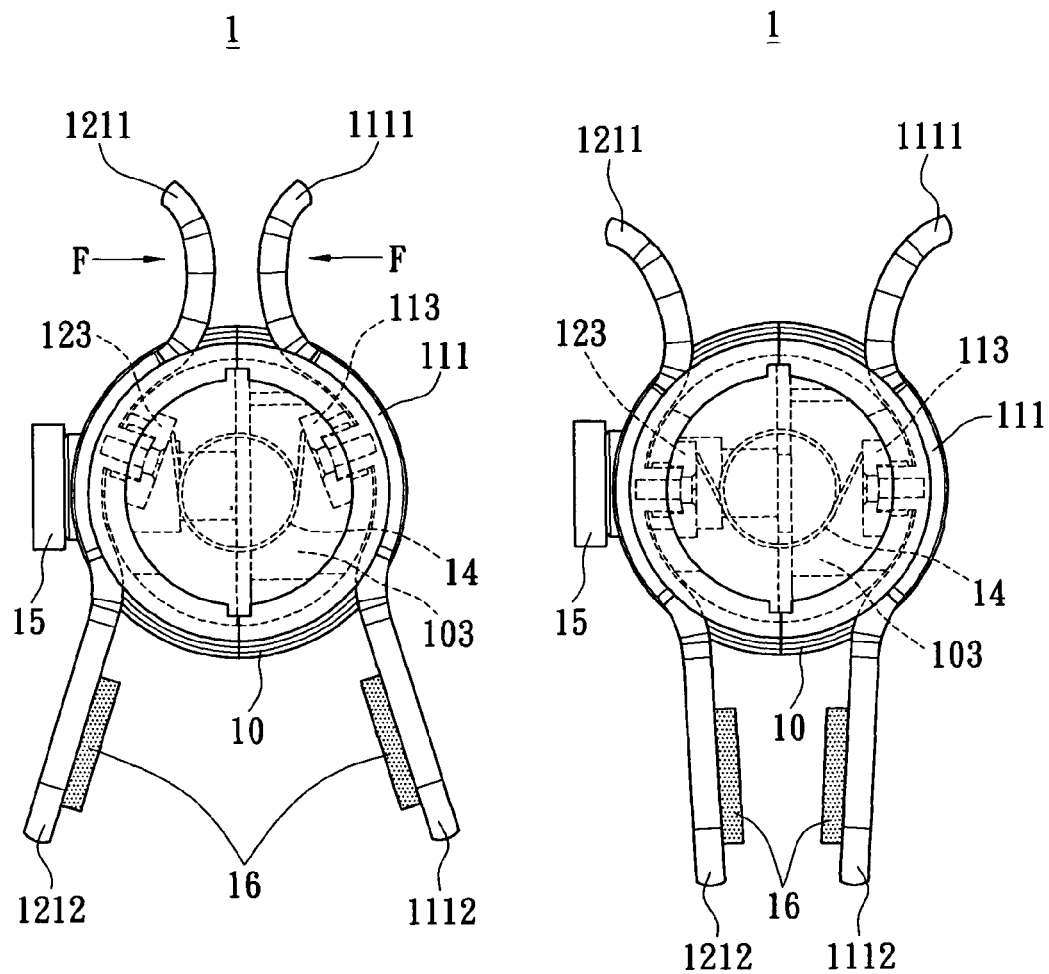
FIG. 3 is a schematic view showing the webcam module having a clamping device according to the present invention being subjected to a force.
Figure 4:
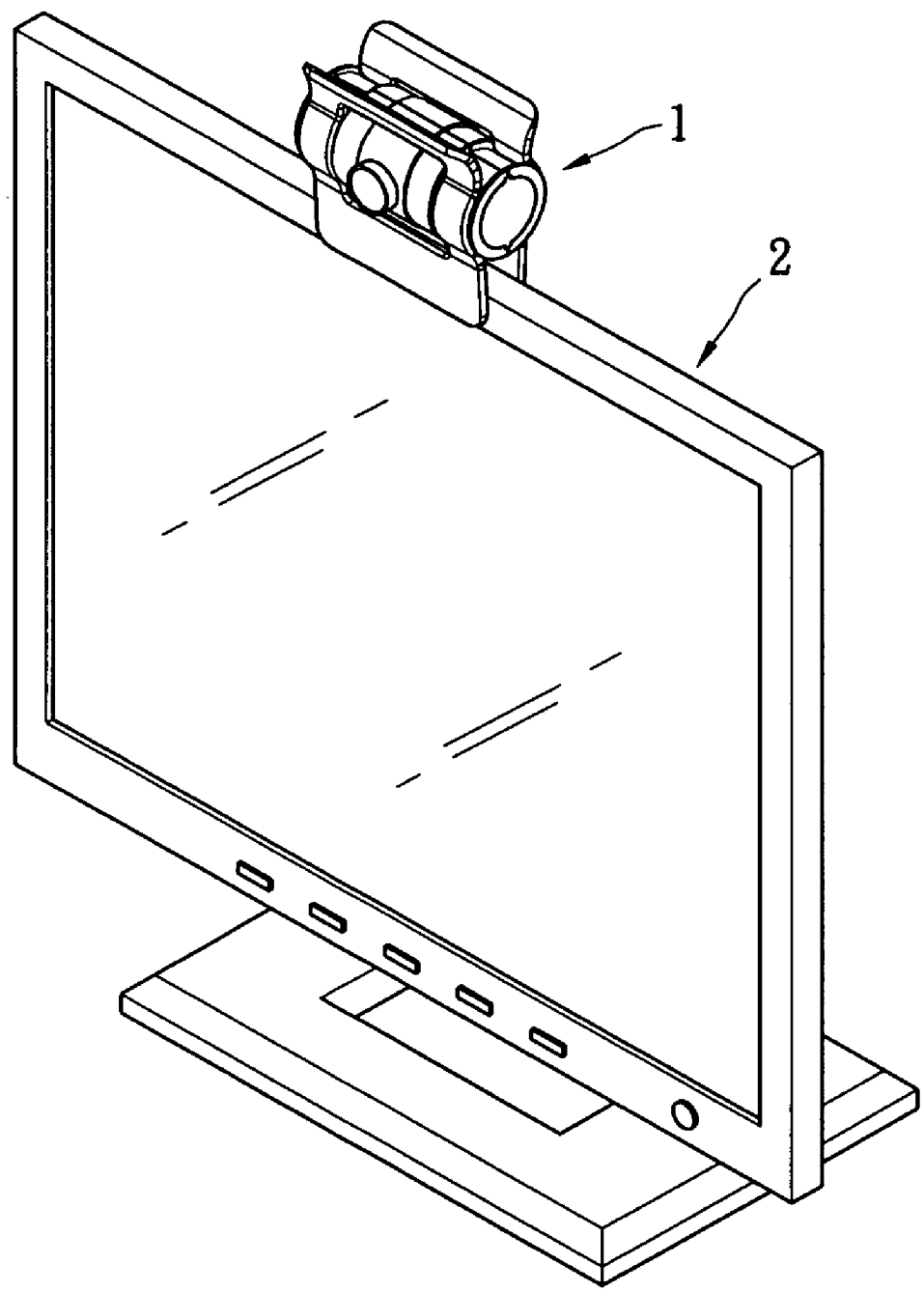
FIG. 4 is a schematic view showing the webcam module having a clamping device according to the present invention being clamped on a screen.

Please refer to FIG. 2. The body portion 10 of the webcam module 1 having a clamping device is formed by a first casing 101 and a second casing 102. In the present embodiment, the body portion 10 is a cylindrical hollow body portion with an accommodated space 103. The first casing 101 and the second casing 102 are each a semi-cylindrical member. The first casing 101 and the second casing 102 can be assembled with each other via engaging, locking or other similar means, thereby forming the body portion 10. Further, the first casing 101 and the second casing 102 are provided with at least one corresponding guiding though-groove respectively. In the present embodiment, the first casing 101 is provided with a first guiding though-groove 1011 and a second guiding though-groove 1012. The second casing 102 is provided with a third guiding though-groove 1021 and a fourth guiding though-groove 1022. The first guiding though-groove 1011 is located at a position corresponding to that of the third guiding though-groove 1021. Similarly, the second guiding though-groove 1012 is located at a position corresponding to that of the fourth guiding though-groove 1022.

The first sliding unit 11 is slidingly provided on the first casing 101. The first sliding unit 11 includes a first sliding piece 111 and at least one sliding block (i.e., a first sliding block 112 and a second sliding block 113 corresponding to the first guiding though-groove 1011 and a second guiding though-groove 1012). The first sliding piece 111 is connected to the sliding block using a connecting piece though the guiding though-groove. The first casing 101 is provided between the first sliding piece 111 and the sliding block of the first sliding unit 11. That is, the first sliding piece 111 is provided outside the first casing 101 so as to cover the first guiding though-groove 1011 and the second guiding though-groove 1012. The first sliding block 112 and the second sliding block 113 are provided inside the first casing 101 and correspond to the first guiding though-groove 1011 and the second guiding though-groove 1012, thereby connecting to the first sliding piece 111. In other words, a first connecting piece 1241 is used to fix the first sliding piece 111 with the first sliding block 112 and a second connecting piece 1242 is used to fix the first sliding piece 111 with the second sliding block 113. The first connecting piece 1241 is limited by the first guiding though-groove 1011 for limiting the position of the first sliding piece 111. In the present embodiment, a screw (i.e. the first connecting piece 1241) is inserted in the first guiding though-groove 1011 for fixing the first sliding piece 111 with the first sliding block 112. Similarly, the second sliding block 113 is fixed on the first sliding piece 111 in the same manner. Thus, one side of the first sliding piece 111 and the first sliding block 112 are provided on the first guiding though-groove 1011. The other side of the first sliding piece 111 and the second sliding block 113 are provided on the second guiding though-groove 1012. The cooperation between the first sliding block 112, the connecting piece 124 and the first guiding though-groove 1011 and the cooperation between the second sliding block 113, connecting piece 124 and the second guiding though-groove 1012 allow the first sliding piece 111 to slide with respect to the first casing 101. Further, the top end and the bottom end of the first sliding piece 111 extend to form a first turning portion 1111 and a first clip 1112 respectively. On the other hand, the first sliding piece 111 can cover the first guiding though-groove 1011 and the second guiding though-groove 1012 for presenting the moisture form the electronic module 15 inside the accommodated space 103. Moreover, the first casing 101 has a first concave portion 1013 respectively on two ends thereof.

The structure of the second sliding unit 12 is substantially the same as that of the first sliding unit 11. The second sliding unit 12 is slidingly provided on the second casing 102. The second sliding unit 12 includes a second sliding piece 121 and at least one sliding block (i.e. a third sliding block 122 and a fourth sliding block 123). The second sliding piece 121 is connected to the sliding block using a connecting piece though the guiding though-groove on the second casing 102. The second casing 102 is provided between the second sliding piece 121 and the sliding block of the second sliding unit 12, that is, the second sliding piece 121 is provided outside the second casing 102 so as to cover the third guiding though-groove 1021 and the fourth guiding though-groove 1022. The third sliding block 122 and the fourth sliding block 123 are provided inside the second casing 102 and correspond to the third guiding though-groove 1021 and the fourth guiding though-groove 1022 respectively, thereby connecting to the second sliding piece 121 using the connecting piece 124. In other words, one side of the second sliding piece 121 and the third sliding block 122 are provided on the third guiding though-groove 1021. The other side of the second sliding piece 121 and the fourth sliding block 123 are provided on the fourth guiding though-groove 1022. The cooperation between the third sliding block 122 and the third guiding though-groove 1021 and the cooperation between the fourth sliding block 123 and the fourth guiding though-groove 1022 allow the second sliding piece 121 to slide with respect to the second casing 102. In other words, a third and a fourth connecting pieces 1243, 1244 are used to fix the second sliding piece 121 with the third sliding block 122 and the fourth sliding block 123 respectively. Similarly, the third and a fourth connecting pieces 1243, 1244 are respectively limited by the third guiding though-groove 1021 and the fourth guiding though-groove 1022 for limiting the position of the second sliding piece 121. Further, the top end and bottom end of the second sliding piece 121 extend to form a second turning portion 1211 and a second clip 1212 respectively. The second turning portion 1211 and the second clip 1212 correspond to the first turning portion 1111 and the first clip 1112 respectively, thereby forming a turning portion and a clip. The first sliding block 112 and the third sliding block 122 together form a set of sliding members, and the second sliding block 113 and the fourth sliding block 123 together form another set of sliding members. On the other hand, the second sliding piece 121 can cover the third guiding though-groove 1021 and the fourth guiding though-groove 1022 for presenting the moisture form the electronic module 15 inside the accommodated space 103. Moreover, the second casing 102 has a second concave portion 1023 respectively on two ends thereof.

On the other hand, the webcam module 1 having a clamping device further has a torsion element, both ends of which are connected to the sliding block of the first sliding unit 11 and the sliding block of the second sliding unit 12. In the present embodiment, the webcam module 1 having a clamping device has two torsion elements. The first torsion element 13 and the second torsion element 14 correspond to the above two sets of sliding members respectively. That is, both ends of the first torsion element 13 are connected to the first sliding block 112 and the third sliding block 122 respectively, while both ends of the second torsion element 14 are connected to the second sliding block 113 and the fourth sliding block 123 respectively. Both of the first torsion element 13 and the second torsion element 14 are accommodated inside the accommodated space 103. In other words, the components of the webcam module 1 are accommodated in the accommodated space 103 constructed by the first casing 101 and the second casing 102 except the first sliding unit 11 and the second sliding unit 12.

After the above components are assembled together, a user can exert a force F to turn inwards the first turning portion 1111 and the second turning portion 1211, thereby opening the first clip 1112 and the second clip 1212 to a predetermined angle. The web module 1 having a clamping device is mounted to a predetermined position (e.g. on a side frame of the liquid crystal screen 2). Then, the user releases the first turning portion 1111 and the second turning portion 1211, so that the torsion force generated by the first torsion element 13 and the second torsion element 14 can be used to clamp the first clip 1112 and the second clip 1212 to the above-mentioned predetermined position without shaking or falling off due to external force.

In the present embodiment, the directions of the first guiding though-groove 1011, the second guiding though-groove 1012, the third guiding though-groove 1021 and the fourth guiding though-groove 1022 are perpendicular to the direction of the cylindrical hollow body portion. The widths of the first sliding block 112 and the second sliding block 113 are larger than those of the first guiding though-groove 1011 and the second guiding though-groove 1012 respectively. Further, the widths of the third sliding block 122 and the fourth sliding block 123 are larger than those of the third guiding though-groove 1021 and the fourth guiding though-groove 1022 respectively. Moreover, the connecting piece 124 is sliding along with the direction of the guiding though-groove and limited inside the guiding though-groove. Via this arrangement, the first sliding block 112 and the second sliding block 113 abut the side of the first guiding though-groove 1011 and the side of the second guiding though-groove 1012 respectively, so that the first sliding block 112 and the second sliding block 113 can slide along the first guiding though-groove 1011 and the second guiding though-groove 1012 respectively. The characteristics of the third sliding block 122 and the fourth sliding block 123 are the same as those of the first sliding block 112 and the second sliding block 113, and thus the description thereof is omitted for simplicity.

Figure 5:
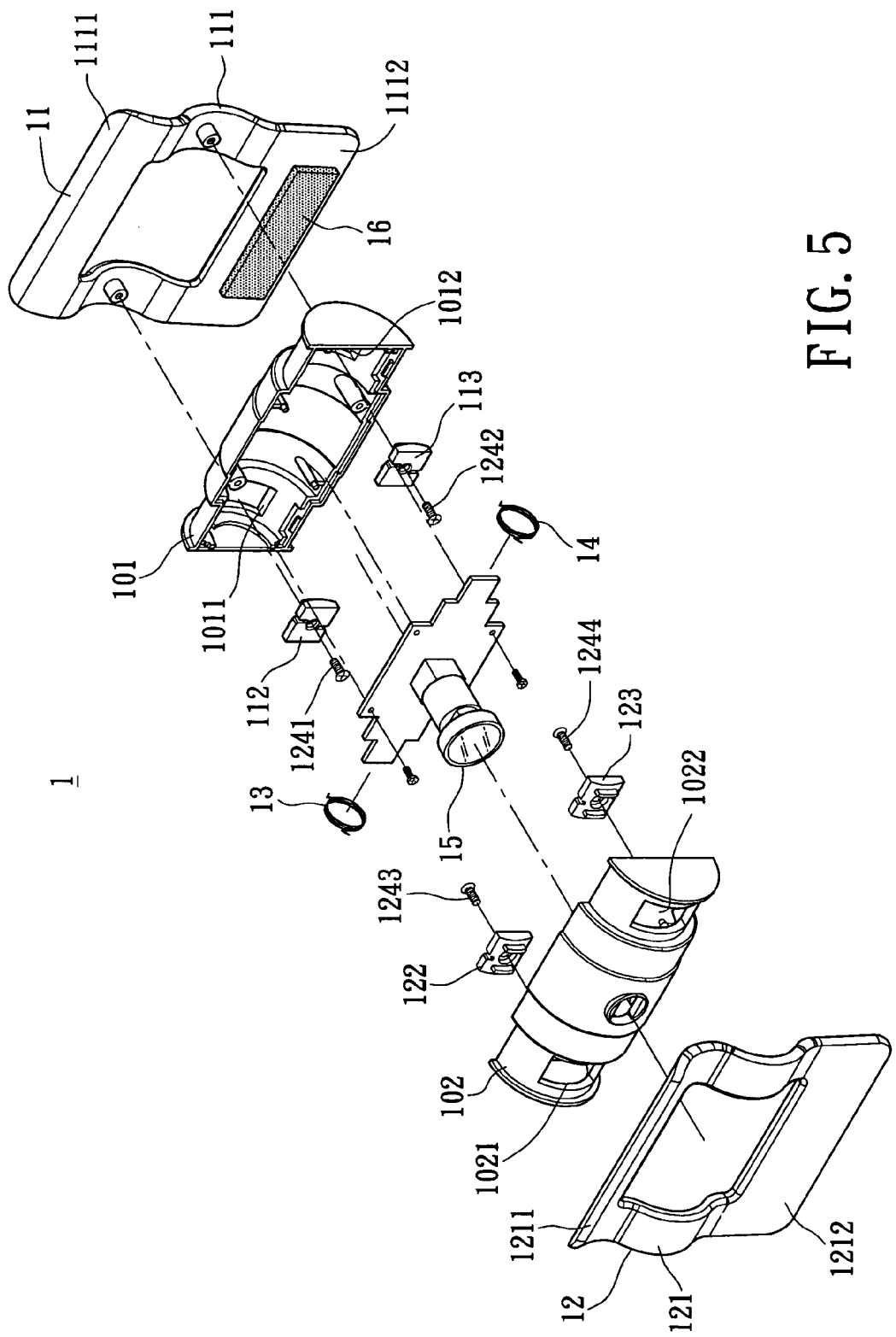
FIG. 5 is an exploded view showing the second embodiment of the webcam module having a clamping device according to the present invention.

The webcam module 1 having a clamping device further includes an electronic module 15 with circuit boards, connecting leads and etc. being accommodated in an accommodated space 103 formed by the body portion 10. The second casing 102 is further provided with a lens module. Further, the shape of the first sliding piece 111 corresponds to that of the first casing 101, and the shape of the second sliding piece 121 corresponds to that of the second casing 102, thereby facilitating the sliding movements of the first sliding piece 111 and the second sliding piece 121. In other words, when a stress is forced on the first turning portion 1111 and the second turning portion 1211, the first clip 1112 and the second clip 1212 are in an open state. Moreover, the first sliding piece 111 is provided with an opening for exposing the lens module to the outside. The first torsion element 13 and the second torsion element 14 are each a torsion spring. The torsion springs are used to provide the first clip 1112 and the second clip 1212 with a force for clamping an article. In other words, the first torsion element 13 and the second torsion element 14 are used to close the first clip 1112 and the second clip 1212. The webcam module 1 having a clamping device further includes a first cover 17 and a second cover 18 that are provided on both sides of the body portion 10 respectively, so that the first torsion element 13, the second torsion element 14 or the circuit boards can be avoided from being exposed to the outside. One first concave portion 1013 and one second concave portion 1023 are constructed as a slot on one end of the body portion 10 for assembling the first cover 17. Similarly, the other first concave portion 1013 and the other second concave portion 1023 are constructed as another slot for assembling the second cover 18. The structure of the slots and the covers 17, 18 can be used for preventing moisture. However, in another embodiment, two ends of the first casing 101 have a semi-circle wall respectively and two ends of the second casing 102 has a corresponding semi-circle wall respectively as shown in FIG. 5. Therefore, the first casing 101 and the second casing 102 can directly form the accommodated space 103 as an enclosure.

The facing sides of the first clip 1112 and the second clip 1212 further includes an elastic element 16 respectively (e.g. a rubber pad or other elastic materials), so that the first clip 1112 and the second clip 1212 can clamp other article more firmly and the clamped article can be protected from being scraped.

According to the above, the present invention has advantageous features as follows.

(I) In the webcam module having a clamping device according to the present invention, the torsion elements are accommodated in the body portion directly, thereby protecting the torsion element more carefully. In this way, the damage caused by the external force when the torsion elements are exposed to the outside can be reduced and the reliability of the present invention may not be affected adversely. The clamping mechanism can be further applied in another electronic module, such as microphone, speaker and so on.

(II) The lens module and the torsion elements are integrated in the body portion, so that the webcam module having a clamping device according to the present invention has a small volume, appropriate weight and size. Thus, it is much easier for the user to provide the webcam module on a side frame of the screen.

(III) The action of the turning portions and the cooperation between the guiding though-groove and sliding block can cause the clips to open or close, so that the webcam module can be clamped on the top side of the screen quickly without falling off due to shakes. Thus, it is more convenient to use the webcam module having a clamping device of the present invention with high quality.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A webcam module having a clamping device, comprising:
    a body portion having a first casing and a second casing, the first casing being provided with a first guiding though-groove and a second guiding though-groove, the second casing being provided with a third guiding though-groove and a fourth guiding though-groove, the body portion having an accommodated space thereinside for accommodating an electronic module;
    a first sliding unit having a first sliding piece, a first sliding block and a second sliding block, the first sliding piece being provided outside the first casing to cover the first guiding though-groove and the second guiding though-groove, the first sliding block and the second sliding block being provided inside the first casing and corresponding to the first guiding though-groove and the second guiding though-groove respectively, thereby connecting to the first sliding piece, the top end and bottom end of the first sliding piece extending to form a first turning portion and a first clip respectively;
    a second sliding unit having a second sliding piece, a third sliding block and a fourth sliding block, the second sliding piece being provided outside the second casing to cover the third guiding though-groove and the fourth guiding though-groove, the third sliding block and the fourth sliding block being provided inside the second casing and corresponding to the third guiding though-groove and the fourth guiding though-groove respectively, thereby connecting to the second sliding piece, the top end and the bottom end of the second sliding piece extending to form a second turning portion and a second clip respectively;
    a first torsion element with its both ends connected to the first sliding block and the third sliding block respectively; and
    a second torsion element with its both ends connected to the second sliding block and the fourth sliding block respectively;
    wherein the first turning portion and the second turning portion are turned to open the first clip and the second clip to a predetermined angle, the first clip and the second clip are clamped at a predetermined position by means of the first torsion element and the second torsion element.

2. The webcam module having a clamping device according to claim 1, wherein the body portion is a cylindrical hollow body portion, the first casing and the second casing are constructed to be engaged with each other.

3. The webcam module having a clamping device according to claim 2, wherein the directions of the first guiding though-groove, the second guiding though-groove, the third guiding though-groove and the fourth guiding though-groove are perpendicular to the direction of the cylindrical hollow body portion.

4. The webcam module having a clamping device according to claim 3, wherein the shape of the first sliding piece corresponds to that of the first casing, and the shape of the second sliding piece corresponds to that of the second casing.

5. The webcam module having a clamping device according to claim 4, wherein the widths of the first sliding block and the second sliding block are larger than those of the first guiding though-groove and the second guiding though-groove respectively, the widths of the third sliding block and the fourth sliding block are larger than those of the third guiding though-groove and the fourth guiding though-groove respectively.

6. The webcam module having a clamping device according to claim 5, wherein the first sliding piece moves along the first guiding though-groove and the second guiding though-groove with respect to the first casing by means of the cooperation between the first sliding block and the first guiding though-groove and the cooperation between the second sliding block and the second guiding though-groove, the second sliding piece moves along the third guiding though-groove and the fourth guiding though-groove with respect to the second casing by means of the cooperation between the third sliding block and the third guiding though-groove and the cooperation between the fourth sliding block and the fourth guiding though-groove.

7. The webcam module having a clamping device according to claim 6, wherein the first torsion element and the second torsion element are each a torsion spring.

8. The webcam module having a clamping device according to claim 7, further comprising a first cover and a second cover that are provided on both sides of the body portion.

9. The webcam module having a clamping device according to claim 1, further comprising a first, a second, a third, and a fourth connecting pieces;
    wherein the first sliding piece is connected to the first sliding block and the second sliding block using the first and the second connecting pieces respectively, and the positions of the first and the second connecting pieces are respectively limited by the first guiding though-groove and the second guiding though-groove;

wherein the second sliding piece is connected to the third sliding block and the fourth sliding block using the third and the fourth connecting pieces respectively, and the positions of the third and the fourth connecting pieces are respectively limited by the third guiding though-groove and the fourth guiding though-groove.

10. A webcam module having a clamping device, comprising:
- a body portion having a first casing and a second casing, the first casing and the second casing being provided with at least one corresponding guiding though-groove respectively, the body portion having an accommodated space thereinside for accommodating an electronic module;
- a first sliding unit having a first sliding piece and at least one sliding block, the first casing being provided between the first sliding piece and the sliding block of the first sliding unit, the sliding block of the first sliding unit corresponding to the guiding though-groove of the first casing and being connected to the first sliding piece, the top end and bottom end of the first sliding piece extending to form a first turning portion and a first clip respectively;
- a second sliding unit having a second sliding piece and at least one sliding block, the second casing being provided between the second sliding piece and the sliding block of the second sliding unit, the sliding block of the second sliding unit corresponding to the guiding though-groove of the second casing and being connected to the second sliding piece, the top end and bottom end of the second sliding piece extending to form a second turning portion and a second clip respectively, wherein the first turning portion and the second turning portion are forced on so as to open the first clip and the second clip; and
- at least one torsion element with its both ends connected to the sliding block of the first sliding unit and the sliding block of the second sliding unit respectively, wherein the torsion element is used to close the first clip and the second clip;
- wherein the first turning portion and the second turning portion are turned to open the first clip and the second clip to a predetermined angle, the first clip and the second clip are clamped at a predetermined position by means of the torsion element.

11. The webcam module having a clamping device according to claim 10, wherein the body portion is a cylindrical hollow body portion, the first casing and the second casing are constructed to be engaged with each other.

12. The webcam module having a clamping device according to claim 11, wherein the shape of the first sliding piece corresponds to that of the first casing, and the shape of the second sliding piece corresponds to that of the second casing.

13. The webcam module having a clamping device according to claim 12, wherein the width of the sliding block is larger than that of the guiding though-groove.

14. The webcam module having a clamping device according to claim 13, wherein the first sliding piece moves along the guiding though-groove of the first casing with respect to the first casing by means of the cooperation between the sliding block of the first sliding unit and the guiding though-groove of the first casing, the second sliding piece moves along the guiding though-groove of the second casing with respect to the second casing by means of the cooperation between the sliding block of the second sliding unit and the guiding though-groove of the second casing.

15. The webcam module having a clamping device according to claim 14, wherein the torsion element is a torsion spring.

16. The webcam module having a clamping device according to claim 15, further comprising a first cover and a second cover that are provided on both sides of the body portion.

17. The webcam module having a clamping device according to claim 10, further comprising a connecting piece, wherein the first sliding piece is connected to the sliding block using the connecting piece, and the position of the connecting piece is limited by the guiding though-groove on the first casing.

18. The webcam module having a clamping device according to claim 17, further comprising another connecting piece, wherein the second sliding piece is connected to the sliding block using the connecting piece, and the position of the connecting piece is limited by the guiding though-groove on the second casing.

* * * * *